Dec. 16, 1969     L. W. PARKER     3,484,636
STATOR ASSEMBLIES FOR AXIAL AIRGAP MACHINES
Filed Jan. 19, 1968     5 Sheets-Sheet 2

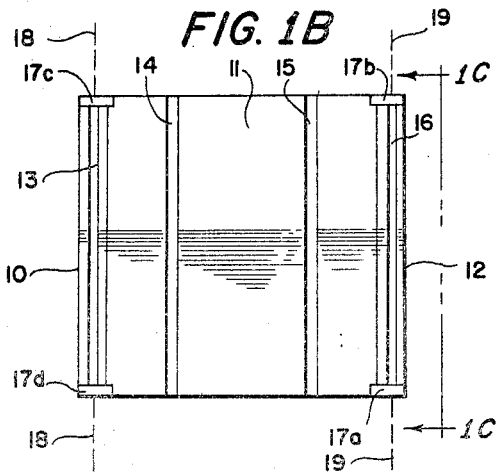
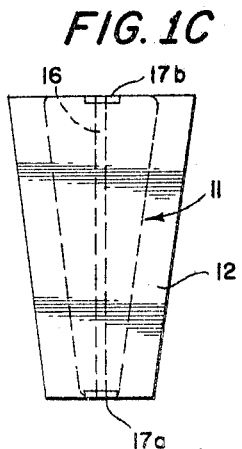
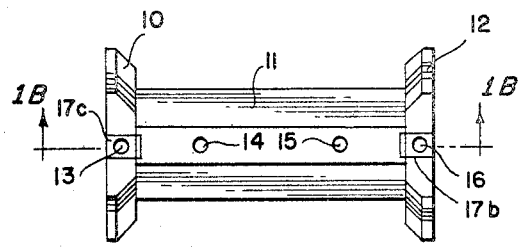
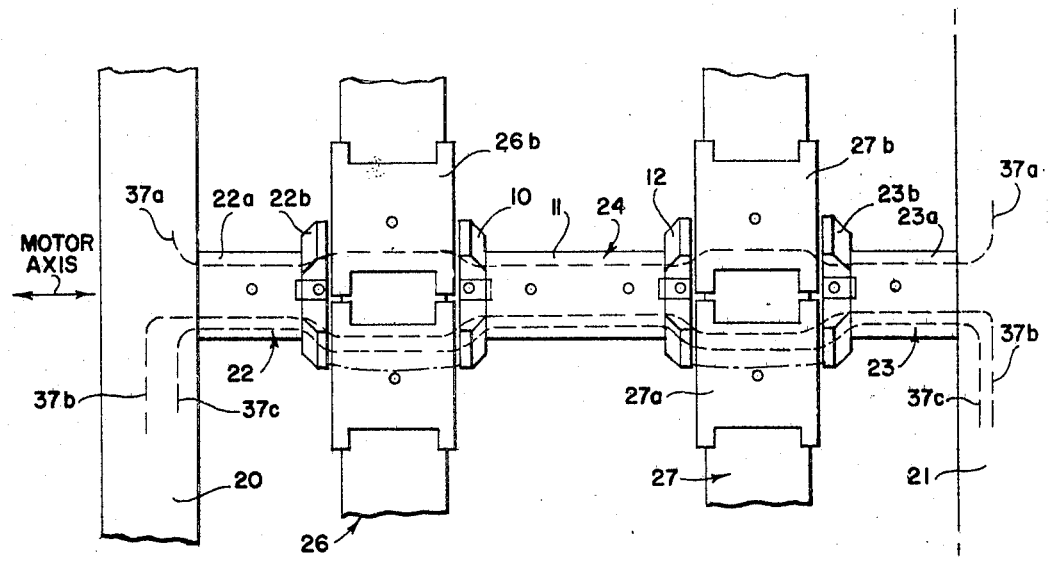

INVENTOR
LOUIS W. PARKER

BY    Hall, Pollock & VandeSande

ATTORNEYS

Dec. 16, 1969   L. W. PARKER   3,484,636
STATOR ASSEMBLIES FOR AXIAL AIRGAP MACHINES

Filed Jan. 19, 1968   5 Sheets-Sheet 3

INVENTOR
LOUIS W. PARKER

BY

ATTORNEYS

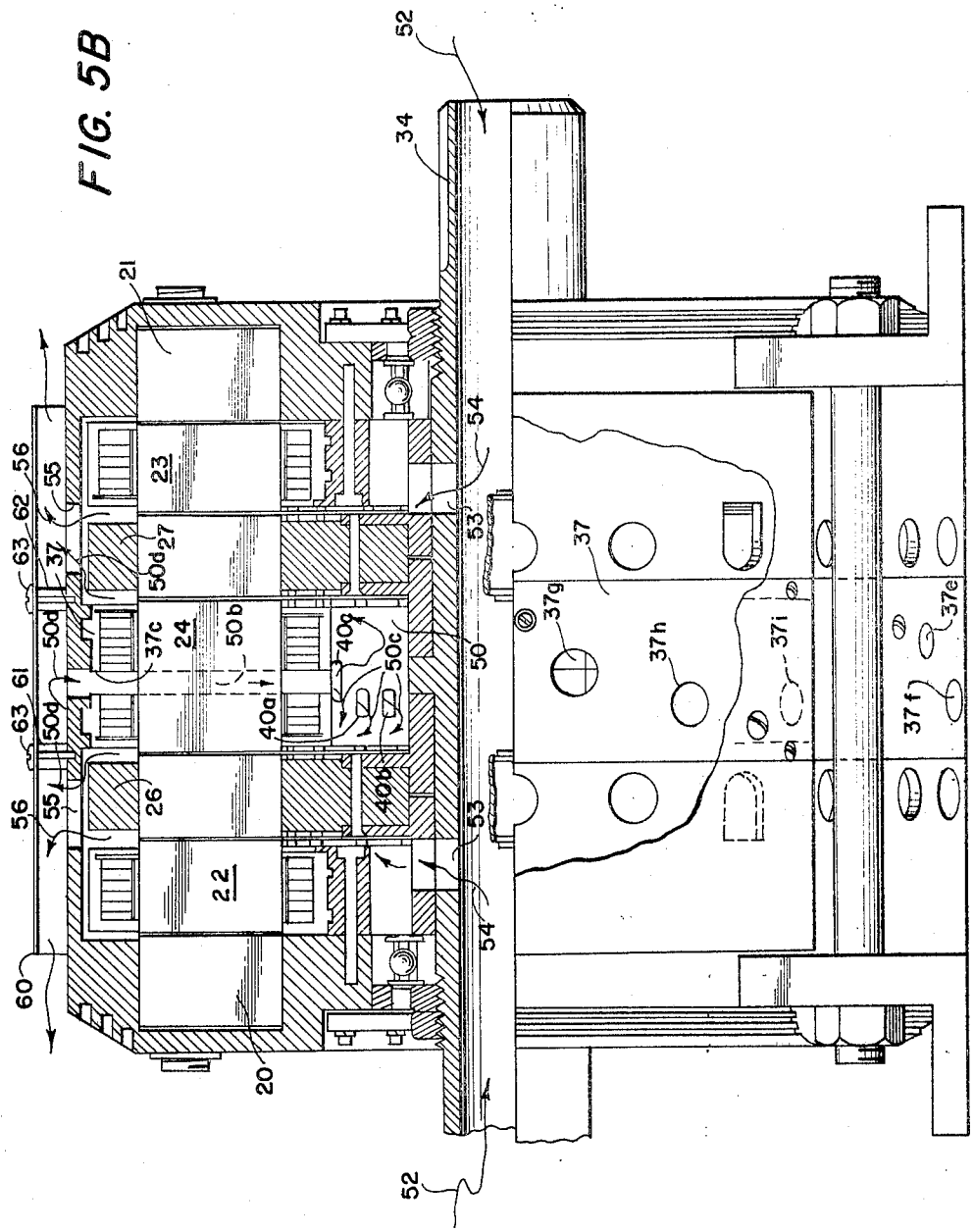

United States Patent Office 3,484,636
Patented Dec. 16, 1969

3,484,636
STATOR ASSEMBLIES FOR AXIAL AIRGAP MACHINES
Louis W. Parker, c/o Parker Electronics, Inc., 2040 N. Dixie Highway, Fort Lauderdale, Fla. 33305
Filed Jan. 19, 1968, Ser. No. 699,089
Int. Cl. H02k 1/22
U.S. Cl. 310—268                                    7 Claims

ABSTRACT OF THE DISCLOSURE

A stator is provided comprising a plurality of laminated blocks spaced from one another about a central axis. Each block consists of a central lamination stack fabricated of oriented magnetic material, bounded by end lamination stacks of non-oriented material. Pre-formed stator coils are disposed around and between the blocks in a distributed winding configuration providing radially extending channels between adjacent pairs of blocks, the overall block, winding and channel structure being integrated by a plastic matrix material. Cooling air, or a coolant liquid, passes through the stator via the radial channels, and means are provided for segregating incoming air, or incoming coolant from emerging air or coolant.

CROSS REFERENCE TO RELATED APPLICATION

One method of forming stator assemblies of the type contemplated by the present invention is described in my copending application Ser. No. 699,196, filed on even date herewith, for "Method of Making Stator Assemblies for Axial Airgap Machines."

BACKGROUND OF THE INVENTION

The present invention relates to dynamo electric machines of the axial airgap type. The general mechanical features and operating principles of such machines have already been described in my prior U.S. Patents No. 2,479,589, No. 2,734,140, No. 3,277,323, and No. 3,296,475. The present invention incorporates the disclosures of these prior patents by reference for a complete discussion of the principles utilized and the constituent elements normally incorporated into axial airgap machines; and a detailed discussion of these principles and elements will accordingly not be given in this case.

In the arrangements of my prior patents, cooling air is drawn into the machine during its operation by reason of a centrifugal pumping action effected by air impinging on the moving magnetic pole stack surfaces of the machine rotors. The air is induced to flow axially into the interior of the machine through the ends of a hollow, perforated central shaft, or through appropriate motor end-bell apertures; and the axially entering air then passes over the surface of the shaft and the shaft support bearings, exiting radially outward via the spaced rotor-stator air gaps. This cooling air arrangement has certain limitations, particularly when it is desired to provide machines of increased horsepower rating, or when it is desired to operate the machines in high temperature environments.

In addition, in the arrangements of my prior patents, the stator lamination stacks consist entirely of relatively expensive oriented magnetic material. While such higher cost material is warranted and highly desirable from the standpoint of machine efficiency, weight, and economy, since a minimum of steel can be used in the design and construction of the machine, the use of such material is wasteful at those portions of the machine where the flux lines tend to depart from the axial direction, since the effective permeability of oriented steel material is considerably reduced for such angularly directed lines of flux.

Moreover, the torque capability of an axial airgap machine is a function of the area of the stator pole stacks, and is also directly proportional to the radial distance between the axis of the machine and the point where the torque is assumed to be generated. Therefore the torque is proportional to the cube of that radius. The placement and configuration of the stator stacks and coils thus plays an important role in the size of the machine, and in the torque capability of any given size machine. The stacks and coil arrangements of my prior patents did not achieve the optimum torque capability for any given size machine.

The present invention achieves improvements in all of these areas, and in other areas which will become apparent.

SUMMARY OF THE INVENTION

The improved machine of the present invention employs a novel stator utilizing a plurality of stator blocks each of which consists of a central lamination stack, fabricated of oriented magnetic material, disposed between a pair of end lamination stacks fabricated of non-oriented magnetic material. This arrangement of oriented and non-oriented lamination stacks assures that high permeability oriented magnetic material is present in those portions of the stator which carry magnetic flux in a truly axial direction, but further assures that other portions of the stator which may be required to carry flux in a direction departing from the axis of the machine do so efficiently and without needless expense incurred through the wasteful use of oriented magnetic materials.

The stator blocks are associated with pre-formed coils having certain coil portions which extend between the blocks and other coil portions which extend over the inner and outer peripheries of the blocks. The coils of the present invention are arranged to achieve a substantial saving in space over that ordinarily required for the reception of hand-shaped "mush" coils typically employed in the past; and, moreover, the coils are so arranged relative to the stator blocks as to maximize the radial distance between torque generating portions of the coils and the axis of the machine. As a result, greater torques can be achieved for a given size machine than in the arrangements of the prior art.

The pre-formed coils are, moreover, distributed between and around the stator blocks in a novel arrangement providing a plurality of radial voids or channels in the overall assembly, with one such radial channel being disposed between each adjacent pair of blocks. As a result of this arrangement, a plurality of radial channels are provided within the body of the stator itself, and these channels receive cooling air, or a liquid coolant, from the exterior of the machine. When this arrangement is used in one or more mid-stator sections of the machine, the amount of cooling effected in each mid-stator section is considerably higher than in the arrangements of my prior patents. Moreover, since the cooling of each mid-stator section is independent of the provisions made for end stator cooling, as well as of the cooling provisions for other mid-stator sections, variable numbers of mid-section stators may be combined with two end stators to produce an adequately cooled machine of any desired horsepower rating.

The provision of radial cooling channels within the body of the stator itself further permits said cooling channels to be interconnected by appropriate manifolds and plumbing to a heat extracting system employing a circulating liquid coolant. Temperature rise in the machine may, by such an arrangement, be closely controlled thereby permitting the machines to be used in severe temperature environments.

When air cooling is provided, moreover, the improved machine of the present invention employs a shield structure for protecting the internal rotating components of the machine against entry of liquid, dust and foreign particles; and this same shield structure acts as a baffle which prevents heated air already exhausted from the machine from being immediately redrawn into the machine. This combination shield and baffle, taking the form of a metallic sheet covering substantially the entire length and upper and side portions of the motor casing and spaced away from the casing to create appropriate airflow channels, substantially improves the operating characteristics and life of the machine.

BRIEF DESCRIPTION OF THE DRAWINGS

FIGURES 1A, 1B and 1C are three views of an improved magnetic pole stack used in the stators of the present invention;

FIGURE 2 is a diagrammatic view of a portion of the magnetic components of an axial airgap machine, illustrating certain benefits achieved by the use of stacks of the type illustrated in FIGURES 1A through 1C;

FIGURE 5B is a side sectional view of the machine shown in FIGURE 5A, sectioned on line 5B—5B of FIGURE 5A to illustrate the improved stator structure and the combined shield and baffle cooperating therewith;

DESCRIPTION OF THE PREFERRED EMBODIMENT

Figures 3, 4:
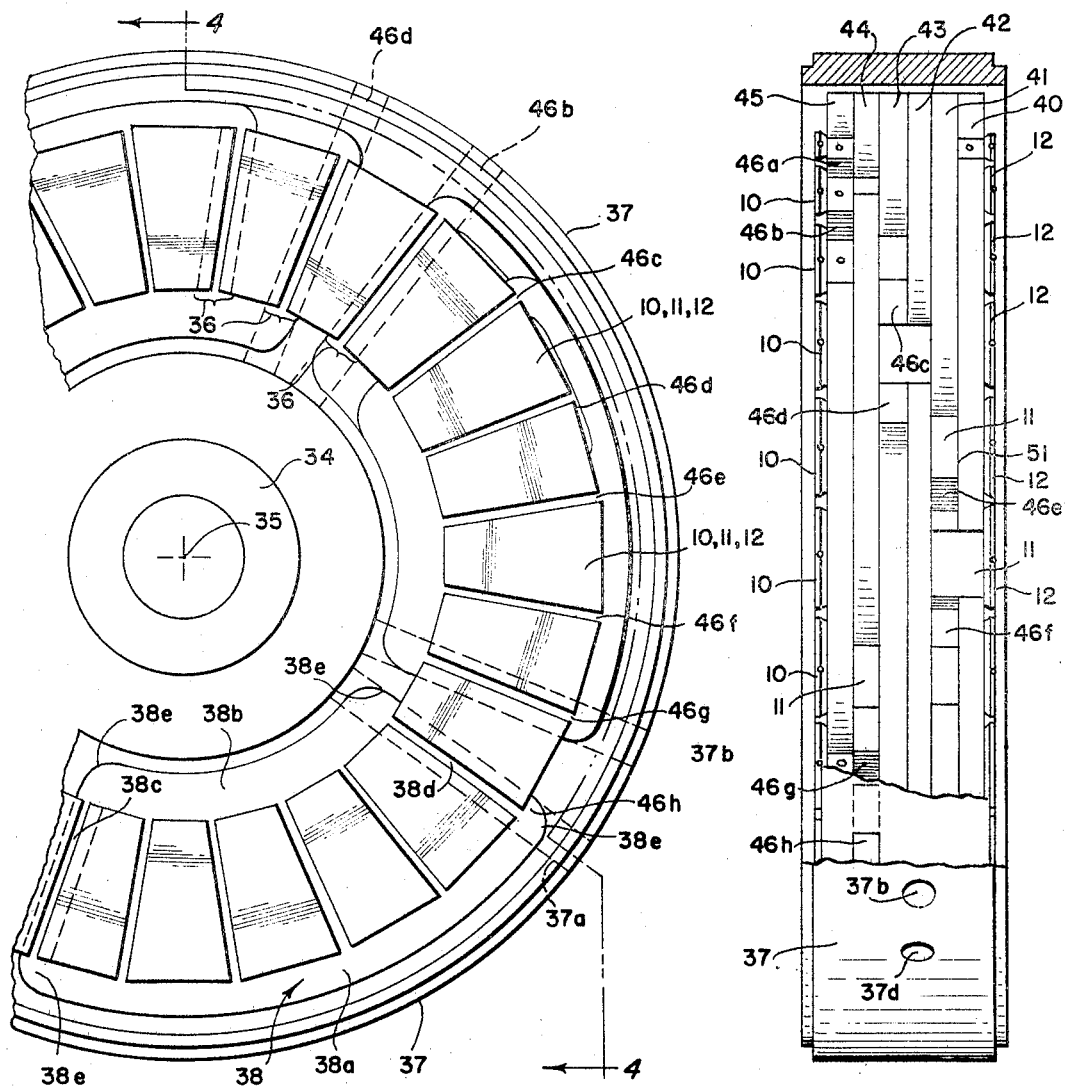
FIGURE 3 is a partial view of a stator assembly viewed along the axis of the machine without its plastic encapsulating matrix, and illustrates the disposition of coils and lamination stocks utilized in the present invention.
FIGURE 4 is a side view of the arrangement shown in FIGURE 3, taken on line 4—4 of FIGURE 3.

The improved stators of the present invention each comprise a plurality of angularly spaced magnetic blocks disposed in a ring configuration about the axis of the machine, associated with pre-formed coils positioned between and around said blocks, the entire block and coil structure being encapsulated in an appropriate plastic matrix providing integral radial air or coolant flow channels extending between adjacent ones of said spaced blocks within the body of the matrix.

The magnetic stator blocks of the present invention differ in construction from those disclosed in my prior patents, and reference is initially made to FIGURES 1A, 1B, and 1C which illustrate a typical stator block. Each stator block is constructed in three sections comprising a central lamination section 11 and end lamination sections 10 and 12. Each of these sections is formed of a plurality of laminations preferably cemented together with an appropriate insulating cement (epoxy) and baked at a moderately high temperature to form a solid block. Drilled or die-stamped holes 13 and 16 are provided in the laminations of the end sections 10 and 12 to accommodate appropriate fitting means adapted to hold the laminations in assembled relation for purposes of fabricating milling operations, and during subsequent cementing and baking operations; and analogous such holes 14 and 15 are provided in the central lamination stack 11 for similar fitting members.

Notches 17a through 17d inclusive are machined or punched at the top and bottom of each stack to provide a means for securing end stacks 10 and 12 to central stack 11. More particularly, when the stacks 10, 11, 12 are disposed relatively to one another in the arrangement shown in FIGURES 1A through 1C, and then placed in a casting plate, plastic material poured into such casting plate tends to form small tabs of plastic material adjacent each of the notches 17a through 17d. The casting arrangement is such that the plastic material fills the casting plate to the levels indicated in FIGURE 1B by broken lines 18 and 19. As a result, stack 11 is covered completely by the plastic matrix material, but stacks 10 and 12 are only partially covered so that the outer portions of stacks 10 and 12 protrude outwardly from the plastic matrix material. The matrix material is subsequently cured at an elevated temperature causing it to solidify, whereafter it is cooled. During cooling, the cured plastic matrix material tends to contract at a greater rate than the steel lamination stacks, producing a force which actively presses end stacks 10 and 12 into firm contact with central stack 11 in the region of notches 17a through 17d. Due to the higher temperature expansion/shrinkage rate of the plastic matrix material, the force induced by the plastic tabs in the region of notches 17a–17d actually tends to angularly position and axially compress the stator pole stack parts toward each other.

As may be best appreciated from FIGURES 1A and 1C, all of stacks 10, 11 and 12 are tapered in configuration. However stack 11 is machined narrower in width than either of stacks 10 or 12. When a plurality of assembled stacks are placed in a circular array (for example as shown in FIGURE 3), the "recessed" configuration of each narrower stack 11 relative to its end stacks 10 and 12 provides a space between stacks into which primary coil windings can be placed. The coil configuration used, and its preferred disposition, will be discussed hereinafter.

In accordance with one of the improvements of the present invention, the material employed in the laminations of central section 11 comprises grain oriented silicon steel, whereas the material employed for the laminations of end sections 10 and 12 preferably comprises non-oriented silicon steel. The purpose in utilizing oriented steel for central stack 11, and non-oriented steel for end stacks 10 and 12, will be best appreciated by reference to FIGURE 2.

FIGURE 2 illustrates certain magnetic components of an axial airgap machine, but does not show the stator coils, shaft, bearings, frame etc. In an axial airgap machine of the general type contemplated herein, the stator assembly may consist of a pair of spaced laminated magnetic end rings 20 and 21 to each of which are attached plural laminated end stator blocks. Typical such end stator blocks are designated 22 and 23. One or more mid-stators can also be provided in spaced relation to the end stators, and one laminated block of one such mid-stator has been designated 24. The mid-stators and end stators are spaced to provide regions therebetween for rotor assemblies 26 and 27.

Each of the stator portions comprises a plurality of laminated blocks entirely similar to the typical blocks designated 22, 23 and 24, angularly spaced from one another about the axis of the machine. Each mid-stator block 24 is constructed in a manner entirely similar to that already described in reference to FIGURE 1, and consists of an oriented central lamination stack 11 associated with non-oriented end stacks 10 and 12. By the same token, each end stator block may consist of grain-oriented lamination stacks 22a or 23a affixed at one of their ends to end ring 20 or 21, and associated with non-oriented lamination stacks 22b and 23b similar in construction to lamination sections 10 or 12.

Rotor 26 may comprise a plurality of magnetic lamination stacks such as 26a, 26b etc. mounted in radially spaced relation to one another about the axis of the machine. Similarly, rotor 27 may comprise a plurality of rotor stacks such as 27a, 27b, etc. Arrangements of this type are described in my prior patents identified earlier, and need not be further described here.

During the operation of the machine, lines of flux designated by broken lines 37a, 37b, and 37c are generated by the windings of the machine and follow a path through the stator magnetic stacks which path begins and ends on a line substantially parallel to the axis of the motor. However, it will be noted that the flux lines are bent as they pass through the stator stack ends 22b, 10, 12, and 23b, due to rotation of the rotor past these stack ends. Similarly, it will be noted that the lines of flux experience an approximate 90° turn as they pass from the end stator blocks into end rings 20 and 21. As a result of these considerations, the flux path assumes a straight line configuration in stacks 22a, 11, and 23a, but is directed at an angle to the axis of the motor adjacent the members 20, 22b, 10, 12, 23b, and 21. The actual angle of the flux lines in the members 22b, 10, 12, and 23b varies with the position of the rotor stacks 26a–26b, 27a–27b during rotation of the rotors, reaching a probable maximum of 45° to the axis of the machine when the motor is heavily loaded.

It is very desirable from the standpoint of efficiency, motor weight, and economy to use a minimum of steel in the design and construction of any motor. This desirable result can be achieved by incorporating high permeability steel for as many applications as possible. A well-known technique of steel fabrication, discussed in my prior patents identified earlier, produces laminations exhibiting a very high permeability along a particular axis (corresponding to the direction in which the steel strip was previously rolled). However, in steels of this type, if the direction of the magnetic lines of force departs by more than a few degrees from the orientation axis of the lamination, a very substantial reduction in effective permeability results. For example, in a magnetic steel lamination of the oriented type when the lines of force are induced to bend as little as 10° in either direction from the orientation axis, the effective permeability of the lamination is reduced to half its maximum value and approximates the permeability of more economical non-oriented steels.

In my prior patents, identified earlier, this particular consideration was not given special attention; and the stator lamination stacks employed therein consisted entirely of grain-oriented materials. However, greater economies are achieved without affecting the magnetic characteristics of the overall structure through the substitution of non-oriented steel at appropriate places. This improvement is achieved in the present invention by using non-oriented steel for the laminations of stator tips 22b 10, 12, and 23b. The improvement is further accomplished by fabricating the magnetic end rings 20 and 21 of non-oriented steel laminations, and end rings 20 and 21 can actually be tape-wound of such non-oriented steel.

FIGURES 3 and 4 illustrate how a plurality of stator blocks, of the type previously described in reference to FIGURE 1, are assembled in relation to one another, and in relation to preformed coil windings, in accordance with the present invention. The stack and coil arrangement shown in FIGURES 3 and 4 does not depict the plastic matrix material in order that the disposition of parts can be best observed.

The improved stator of the present invention is mounted in surrounding relation to the motor shaft 34, which is in turn concentric with the central axis 35 of the machine. The stator comprises a plurality of laminated blocks each of which consists of tapered end sections 10 and 12, and an intervening narrower tapered section 11 (see FIGURE 4), whereby a space 36 (FIGURE 3) is provided between each adjacent pair of blocks. The stator further includes an outer stator ring 37 provided with a plurality of apertures 37a, 37b etc. The inner periphery of ring 37 is preferably spaced from the facing ends of the several lamination blocks by a distance corresponding essentially to the spacing between adjacent central lamination sections 11. The spaces 36 between lamination sections 11, and the space between the stator blocks and stator ring 37, are intended to receive coils in the manner to be described.

Inasmuch as the torque capability of an axial airgap motor is a function of the area of the stator pole stacks, which area increases as the square of the diameter of placement of the stacks, and since moreover the torque developed in the machine is directly proportional to the radius arm measured outward from the machine axis 35 to the point where the torque is assumed to be generated, the torque actually developed is a third power function of this radius. Accordingly it is highly preferably that pre-formed coils be used of a shape making the most efficient use of the space at the outer periphery of the motor lying between stator ring 37 and the outer periphery of the several lamination stacks 10–11–12.

The several coils used in the present invention are preferably formed of rectangular section copper conductors, and are pre-formed over specially shaped dowels yielding a thickness to each coil in its curved sections which is identical to the thickness of the coil in the region 36 between adjacent lamination stacks. A number of such coils, as used in the stator structure of the present invention, have been depicted in side view in FIGURE 3. It will be seen that a typical such coil, designated 38, includes an outer section 38a lying between stator ring 37 and the outer periphery of the several stator blocks, an inner section 38b disposed adjacent to the inner peripheral edges of the stator blocks, side portions 38c and 38d extending between the several stator blocks (through the spaces 36) and curved portions 38e interconnecting inner and outer portions 38a and 38b with side portions 38c and 38d. Each of the coils, such as 38, are so formed that the thicknesses of all of coil parts 38a through 38e are the same. This use of a uniform thickness pre-formed coil permits the area of the stator blocks to be maximized. Moreover, the disposition of the several stator blocks with respect to outer stator ring 37 is so chosen in relation to the thickness of the coil 38 that the outer portion 38a of the coil is disposed at the farthest practical distance from the axis 35 of the machine and substantially completely fills the space between the stator blocks and the stator ring 37.

The stator coil shape and disposition thus selected in the present invention makes the stator pole stack area, and the radial spacing of the coil from the axis of the machine, optimumly large. By way of comparison, partially pre-formed or "mush" coils of the types utilized heretofore are much more wasteful of space inasmuch as an approximately round bundle of wires (as opposed to the rectangular section conductors of the present invention) protrude out relatively further from the pole stacks, due to the hand bending and shaping which must be utilized in any wiring process using such mush coils. Mush coils, in order that they may be shaped in place, require round section wires to facilitate the sliding of one wire over another in the coil, and this results in a further increase in peripheral wire space of approximately 27 percent. The combined saving in space where pre-formed coils of rectangular cross-section wires are utilized, is in the order of 48 percent; and to this saving must be added space ordinarily required to hand shape round bundles of wires as they emerge from the pole slots.

The use of the improved coil configurations contemplated by the present invention, in association with flat insulators 51 (see FIGURE 4) inserted between adjacent coils of different potentials, provides a degree of safety impossible to achieve with "mush" coils, and further achieves a substantial volumetric space saving. The overall result is, therefore, to far simplify the wiring technique, minimize the space which must be employed for coil disposition, maximize the stator pole area, and produce a stator capable of optimum torque generation.

The several pre-formed coils described above are positioned between the lamination stacks or stator blocks in a staggered configuration, utilizing a partially distributed winding tehcnique. The winding disposition is such that the several coils do not completely cover or fill the space between adjacent stator blocks; and, to the contrary, a radial void or channel is intentionally left between each adjacent pair of blocks. Examining FIGURE 4, a plurality of coils 40 through 45 inclusive have been shown in position, with said coils being mounted in staggered relation to one another relative to the several spaces 36 between adjacent blocks 10-11-12. A similar disposition of other coils will be apparent from FIGURE 4; and in the distributed winding technique illustrated in FIGURES 3 and 4, the motor is provided with two coils per pole per phase. The winding arrangement employed is such that a number of radial channels or voids designated 46a through 46h etc. (see FIGURES 3 and 4) are intentionally left between the lamination blocks, with one such channel being provided between each adjacent pair of blocks.

The several radial channels 46a etc. thus produced by the coil and stator block arrangement are actually defined within the body of the plastic matrix material which integrates the coils, stator blocks, etc., into a unitary structure. More particularly, by use of the technique described in my copending application S.N. 699,196, identified earlier, the pre-formed stator coils and stator blocks are appropriately positioned between casting plates; the intentionally left radial voids are plugged; plastic matrix material is then poured into the casting plates to fill all existing voids; the plastic material is then cured and cooled; and the plugs and casting plates are then removed from the assembly to leave the desired radial voids between the integrated stator coils and stator blocks. The several radial channels 46a etc., can be utilized for the radial passage of a cooling fluid (gaseous or liquid) through the body of the stator itself, whereby far greater stator cooling can be achieved than in the arrangements of my prior patents identified earlier.

Figure 5A:
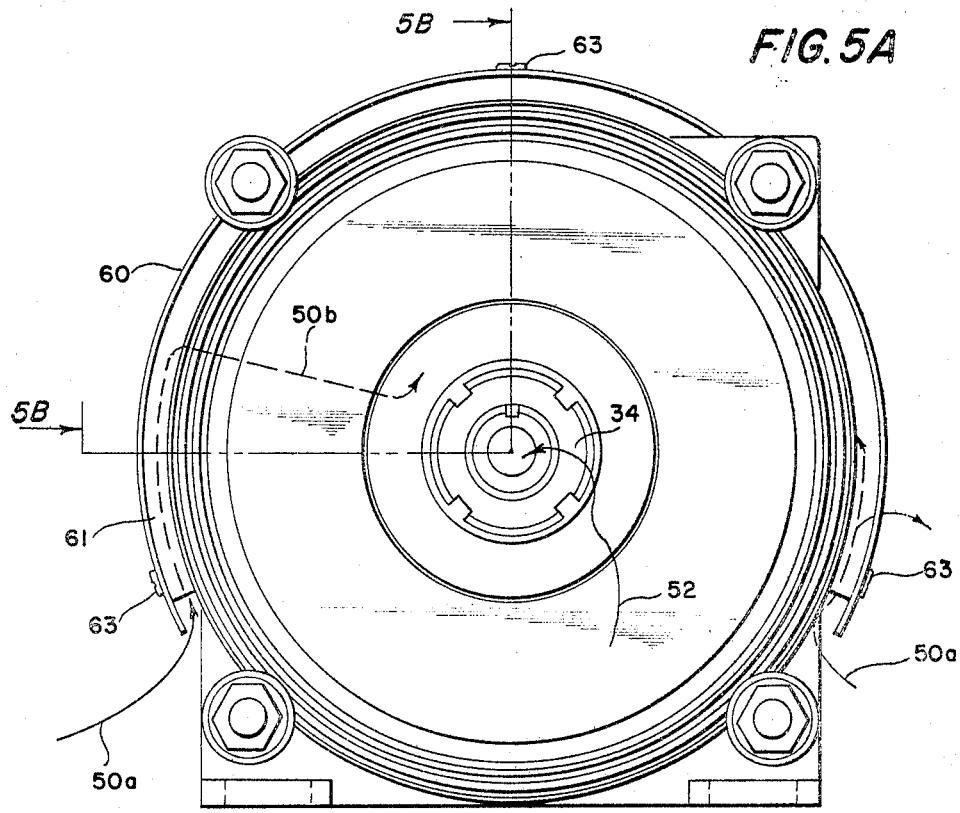
FIGURE 5A is an end view of an axial airgap motor constructed in accordance with the present invention, illustrating the improved combined baffle and shield structure utilized for air cooling.

FIGURES 5A and 5B depict an axial airgap machine which incorporates the improved stator of the present invention as a mid-stator section. More particularly, the machine comprises a central shaft 34 carrying rotors 26 and 27 for rotation between a mid-stator section 24 and end stator sections comprising end rings 20 and 21 and end stator blocks 22 and 23. The mid-stator section 24 is constructed in accordance with the arrangements already described, and includes an outer stator ring 37 provided with a plurality of openings 37a etc. (see also FIGURE 4) communicating with the several radial channels 46a etc. The several radial channels thus provided in the mid-stator section communicate with a common central plenum 50 surrounding shaft 34, and plenum 50 in turn communicates with the airgaps between mid-stator section 24 and rotors 26 and 27. As a result, mid-stator section 24 is cooled during operation of the machine by air entering through the exterior apertures provided in the motor casing and in the outer stator ring (arrow 50a). The air passes radially inward through the stator channels (arrow 50b) emerging into plenum 50 (arrow 50c), and then passes radially outward through the machine air gaps to the machine exterior (arrows 50d).

It will be noted that the cooling provision thus provided for mid-stator section 24 is independent of the cooling otherwise provided in the machine. In the particular arrangement shown in FIGURES 5A and 5B, the shaft 34 is hollow and is adapted to admit cooling air along the paths designated 52. This axial cooling air flows through orifices 53 along paths 54, and then passes radially through the air gaps between the end stator structures and rotors 22 and 23 to emerge through orifices 55 in the outer casing of the machine (arrows 56). This particular cooling arrangement, and variations thereof, all of which are discussed in my prior patents identified earlier, is entirely adequate to cool the end stator sections. The amount of cooling required for each end stator is only slightly more than half that required for a mid-stator section, and furthermore, the end stators have large exterior areas which are exposed to surrounding atmosphere thereby greatly increasing the cooling effects on the end stator sections.

The independent cooling arrangements provided for the mid-stator and end stator sections has a real advantage in practice. Thus, while the arrangement of FIGURE 5B utilizes only a single mid-stator section, it may be desired to increase the number of mid-stator sections provided so as to increase the horsepower rating of the machine. This can be readily done with the improved mid-stator of the present invention simply by varying the length of shaft 34, and by then mounting as many additional mid-stator sections and rotor sections as may be desired between the end stator sections. The rating of the machine can thus be readily stepped upwardly in increments of 100 percent from that of the simplest machine shown in FIGURE 5B. By using mid-stator sections of the types shown in FIGURE 5B, such an increase in the number of mid-stator sections simultaneously increases the cooling capacity of the machine by a similar increment.

In the arrangement of FIGURES 5A and 5B, means are also provided for shielding the machine against entry of liquids, dust and foreign particles; and these same means provide a baffle which prevents heated air already exhausted from the motor from being immediately redrawn into the machine. The structure providing these functions comprises a combination shield and baffle taking the form of a curved metallic sheet 60 covering substantially the entire length and the upper and side portions of the machine casing, and spaced away from the machine casing by curved barrier strips 61 and 62 coextensive with structure 60. The entire structure is held in place by bolts 63. Barrier strips 61 and 62 are axially spaced from one another and engage the motor casing at positions between the opposing edges of the mid-stator section 24 and the casing apertures 55. As a result, the pumping action of the surfaces of rotors 26 and 27, during their rotation, causes cooling air to be drawn into the interior of the machine through the region between barrier strips 61 and 62, from a location adjacent the lower sides of the machine as indicated by arrows 50a in FIGURE 5A. This air then passes along the exterior surface of the machine case and is admitted to the mid-stator sections, passing radially inward along paths such as 50b in the manner already described. The air from shaft 34 and from plenum 50, passing radially outward through the air gaps between mid-stator section 24 and the adjacent rotors, is isolated by strips 61 and 62 from the incoming cool air supplied to the mid-stator section; and this emerging heated air spills outwardly through the gap between sheet 60 and the machine casing.

By using even more intensive liquid cooling, the power rating of the motor (or generator) can be increased very substantially. For such liquid cooling, the mid-stator section can be revised in the manner indicated in FIGURE 6. More particularly, a mid-stator section 65 of the type already described can have its various radial channels 65a, 65b etc. interconnected adjacent the shaft of the machine by means of a central manifold 66 having a channel-shaped interior 67. Central manifold 66 can be fabricated of heavy neoprene silastic, and it may be cemented in place bearing on and sealing against the smooth surface imparted to the plastic matrix material during the fabrication of the stator. A pair of peripheral manifolds 69 and 70, taking the form for example, of a metal band or bands encircling the machine and sealed to the stator casing by means of gaskets 71, can also be provided. Manifold 69 includes a channel-shaped interior which overlies the exterior ends of half of the radial channels in the mid-stator section; and manifold 70 is provided with a similar channel-shaped interior 73 which overlies the exterior ends of the other half of said radial cooling channels. Each of the peripheral manifolds 69 and 70 can be provided with fittings such as 74 for interconnecting the manifolds, and thereby the stator radial cooling channels, to an appropriate piping system filled with liquid coolant.

Figure 7:
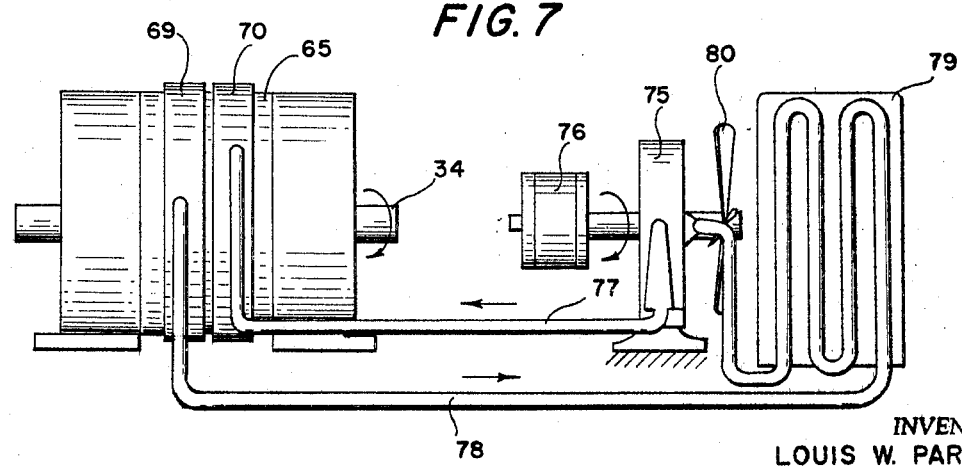
FIGURE 7 is a diagrammatic view of an axial airgap motor or generator employing one or more stators of the type shown in FIGURE 6, in conjunction with a coolant circulation and heat exchange system.
Figure 6:
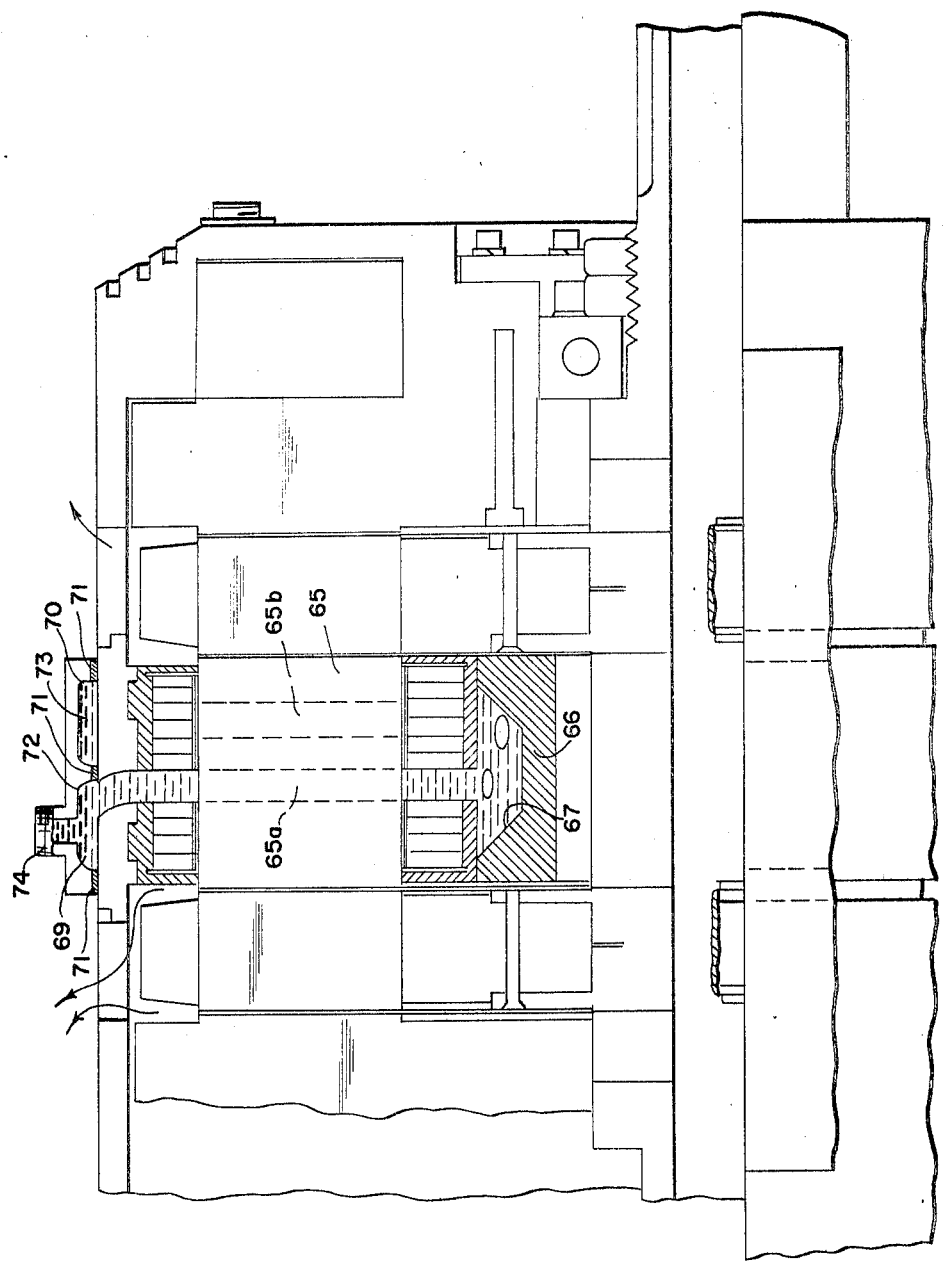
FIGURE 6 is a partial cross-sectional view of a modified stator arrangement employing manifolds for circulating a liquid coolant through the stator.

The overall arrangement, employing a liquid cooled stator of the type shown in FIGURE 6, may take the form illustrated in FIGURE 7. A coolant pump 75, driven by a separate motor 76 or alternatively driven by shaft 34 of the axial airgap machine, supplies liquid coolant via piping 77 to peripheral manifold 70. This coolant flows through the stator radial passages associated with manifold 70 to central manifold 66 (FIGURE 6), and then passes radially outward through other of the radial passages to peripheral manifold 69. The heated coolant is then passed via piping 78 to a heat exchanger 79, and then back to pump 75 for recirculation. A fan 80, which may rotate in conjunction with pump 75, forces a flow of air over and between the cooling coils in heat exchanger 79, to remove heat from the system.

It will be appreciated, of course, that the arrangement shown in FIGURES 6 and 7 effects liquid cooling of the mid-stator section or sections. The end stator sections may, if desired, also be liquid cooled. In the alternative, the end stator sections may still be air cooled, in accordance with the considerations already described in reference to FIGURE 5B, so that the overall system combines liquid cooling and air cooling. In either event, the cooling arrangement will permit use of the axial airgap machine in very severe temperature environments.

While I have thus described preferred embodiments of the present invention, many variations will be suggested to those skilled in the art. It must therefore be understood that the foregoing description is intended to be illustrative only and not limitative of my invention; and all such variations and modifications as are in accordance with the principles described are meant to fall within the scope of the appended claims.

Having thus described my invention, I claim:

1. An axial airgap machine comprising a rotatable central shaft having rotor means mounted for rotation with said shaft, a stator section disposed adjacent said rotor means, said stator section including means defining a central plenum disposed adjacent to and in surrounding relation to said shaft, said stator section further including a plurality of lamination stacks spaced from one another in a circular array about said plenum, a plurality of electrical windings disposed in a distributed array around and between said stacks, each of said windings having an outer winding portion extending in a circumferential direction over the outer periphery of a plurality of said stacks, an inner winding section disposed adjacent the inner peripheries of said plurality of stacks, and side winding sections interconnecting said inner and outer winding sections and extending in a radial direction between said stacks, said plurality of windings being positioned in essentially planar side-by-side staggered relation to one another in a direction parallel to said shaft with the several side winding sections only partially filling the radial spaces between said stacks to leave radial voids each of which is bounded respectively by two adjacent ones of said stacks and by two adjacent axially spaced ones of said windings, said voids defining a plurality of elongated substantially radial tubular channels disposed within said stator section, at least one such channel being disposed adjacent every one of said lamination stacks and adjacent a portion of every one of said plurality of windings, each of said elongated channels opening at its inner end into said plenum, and each of said elongated channels opening at its outer end into the exterior of said machine, inlet means for admitting a cooling fluid in generally radial directions from the exterior of said machine through the body of said stator via said tubular channels to said central plenum, and outlet means for thereafter passing said cooling fluid in generally radial directions from said central plenum to the exterior of said machine.

2. The machine of claim 1 including central manifold means interconnecting the inner ends of said channels, first peripheral manifold means interconnecting the outer ends of some of said channels, second peripheral manifold means interconnecting the outer ends of other ones of said channels, and circulation means coupled to said peripheral manifold means for circulating a liquid coolant through said radial channels via said central manifold means.

3. The machine of claim 1 wherein said machine defines a radial airgap between said rotor means and said stator section, said central plenum communicating with said radial airgap, whereby said cooling fluid passes radially inward toward the axis of same machine from the exterior of the machine via said channels toward said plenum and then passes radially outward from said plenum to the exterior of said machine via said airgap.

4. The machine of claim 1 wherein said inlet means comprises an air intake including a curved shield covering substantially the entire length as well as the upper and side portions of the exterior casing of said machine, and barrier means comprising spacers located between the exterior casing of said machine and the interior of said shield and positioned adjacent the opposing axial ends of said stator, the lowermost edge of said shield being spaced away from the casing of said machine to admit air to the confined region defined between said casing, said shield, and said spacers.

5. The machine of claim 1 wherein said lamination stacks comprise a plurality of tapered blocks of magnetic material positioned in spaced relation to one another with the narrower end of each block facing toward said shaft, each of said blocks comprising a central laminated section of oriented steel bounded, in the axial direction of said machine, by a pair of tapered laminted end sections of non-oriented steel, said end sections being larger in cross sectional area than the cross sectional area of said central section whereby each of said central sections assumes a recessed configuration relative to its associated end sections for the reception of said side winding sections between adjacent ones of said blocks.

6. The machine of claim 1 wherein each of said windings comprises electrical conductors of rectangular cross section, the thickness of said winding being uniform throughout.

7. The machine of claim 1 including a pair of end stator sections disposed in spaced relation to one another adjacent the opposing ends of said shaft, each of said end stator sections comprising a laminated structure consisting of non-oriented steel laminations.

References Cited

UNITED STATES PATENTS

| | | | |
|---|---|---|---|
| 3,277,323 | 10/1966 | Parker | 310—268 XR |
| 2,347,517 | 4/1944 | Smalley | 310—63 |
| 3,188,833 | 6/1965 | Robinson | 310—61 XR |
| 2,792,511 | 5/1957 | Horstman | 310—216 |
| 3,413,499 | 11/1968 | Barton | 310—64 XR |
| 3,294,997 | 12/1966 | Shapiro | 310—268 |
| 2,830,206 | 4/1958 | Bressiere | 310—268 XR |
| 3,275,863 | 9/1966 | Fodor | 310—254 XR |
| 2,961,555 | 11/1960 | Towne | 310—64 XR |
| 1,877,904 | 9/1932 | Laffoon | 310—63 |

MILTON O. HIRSHFIELD, Primary Examiner

B. A. REYNOLDS, Assistant Examiner

U.S. Cl. X.R.

310—60, 254